(12) United States Patent
Nielsen

(10) Patent No.: US 12,744,391 B2
(45) Date of Patent: Sep. 22, 2026

(54) WIND POWER PLANT

(71) Applicant: VESTAS WIND SYSTEMS A/S, Aarhus (DK)

(72) Inventor: Jesper Nielsen, Risskov (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 142 days.

(21) Appl. No.: 18/873,268

(22) PCT Filed: Jun. 8, 2023

(86) PCT No.: PCT/DK2023/050137
§ 371 (c)(1),
(2) Date: Dec. 9, 2024

(87) PCT Pub. No.: WO2023/237165
PCT Pub. Date: Dec. 14, 2023

(65) Prior Publication Data

US 2026/0269626 A1 Sep. 10, 2026

(30) Foreign Application Priority Data

Jun. 9, 2022 (DK) ............................ PA202270304

(51) Int. Cl.
*H02J 3/38* (2026.01)
*F03D 7/04* (2006.01)
(Continued)

(52) U.S. Cl.
CPC .............. *H02J 3/381* (2013.01); *F03D 7/048* (2013.01); *F03D 9/257* (2017.02); *H02J 2101/28* (2026.01)

(58) Field of Classification Search
CPC ....... H02J 3/381; H02J 2101/28; F03D 7/048; F03D 9/257
See application file for complete search history.

(56) References Cited

U.S. PATENT DOCUMENTS

2010/0033016 A1 2/2010 Thorburn et al.
2020/0370537 A1 11/2020 Hospers
2024/0195183 A1* 6/2024 Brogan .................. H02J 3/381

FOREIGN PATENT DOCUMENTS

CN 112052544 A 12/2020
CN 213959755 U 8/2021
(Continued)

OTHER PUBLICATIONS

Decision to grant Received for EP Application No. 23731089.1, mailed on Jan. 15, 2026, 2 pages.
(Continued)

*Primary Examiner* — Joseph Ortega
(74) *Attorney, Agent, or Firm* — Patterson + Sheridan, LLP; Gero G. McClellan

(57) ABSTRACT

A wind power plant includes a control system operatively connected to switchgear devices of a plurality of wind turbine clusters, and wherein the control system is configured to identify the existence of a no-generation condition affecting at least one of the plurality of wind turbine clusters; control the switch status of the switchgear devices, based on the identification, to control the connection status of each of the plurality of wind turbine clusters to an inter-cluster power network so as to reduce no load losses of the wind turbine clusters.

18 Claims, 6 Drawing Sheets

(51) Int. Cl.
*F03D 9/25* (2016.01)
*H02J 101/28* (2026.01)

(56) References Cited

FOREIGN PATENT DOCUMENTS

| | | | |
|---|---|---|---|
| EP | 2645530 | A1 | 10/2013 |
| EP | 3222848 | A1 | 9/2017 |
| JP | 2003061396 | A | 2/2003 |
| WO | 0169754 | A1 | 9/2001 |
| WO | 2016101130 | A1 | 6/2016 |
| WO | 2017097308 | A1 | 6/2017 |
| WO | 2021180280 | A1 | 9/2021 |

OTHER PUBLICATIONS

Danish Patent and Trademark Office, 1st Technical Examination including the Search Report and Search Opinion for Application PA 2022 70304 dated Jan. 6, 2023 (Jun. 1, 2023).

PCT International Search Report and Written Opinion of The International Searching Authority for Application PCT/DK2023/050137 dated Sep. 12, 2023 (Sep. 12, 2023).

Intention to grant Received for EP Application No. 23731089.1, mailed on Oct. 2, 2025, 8 pages.

* cited by examiner

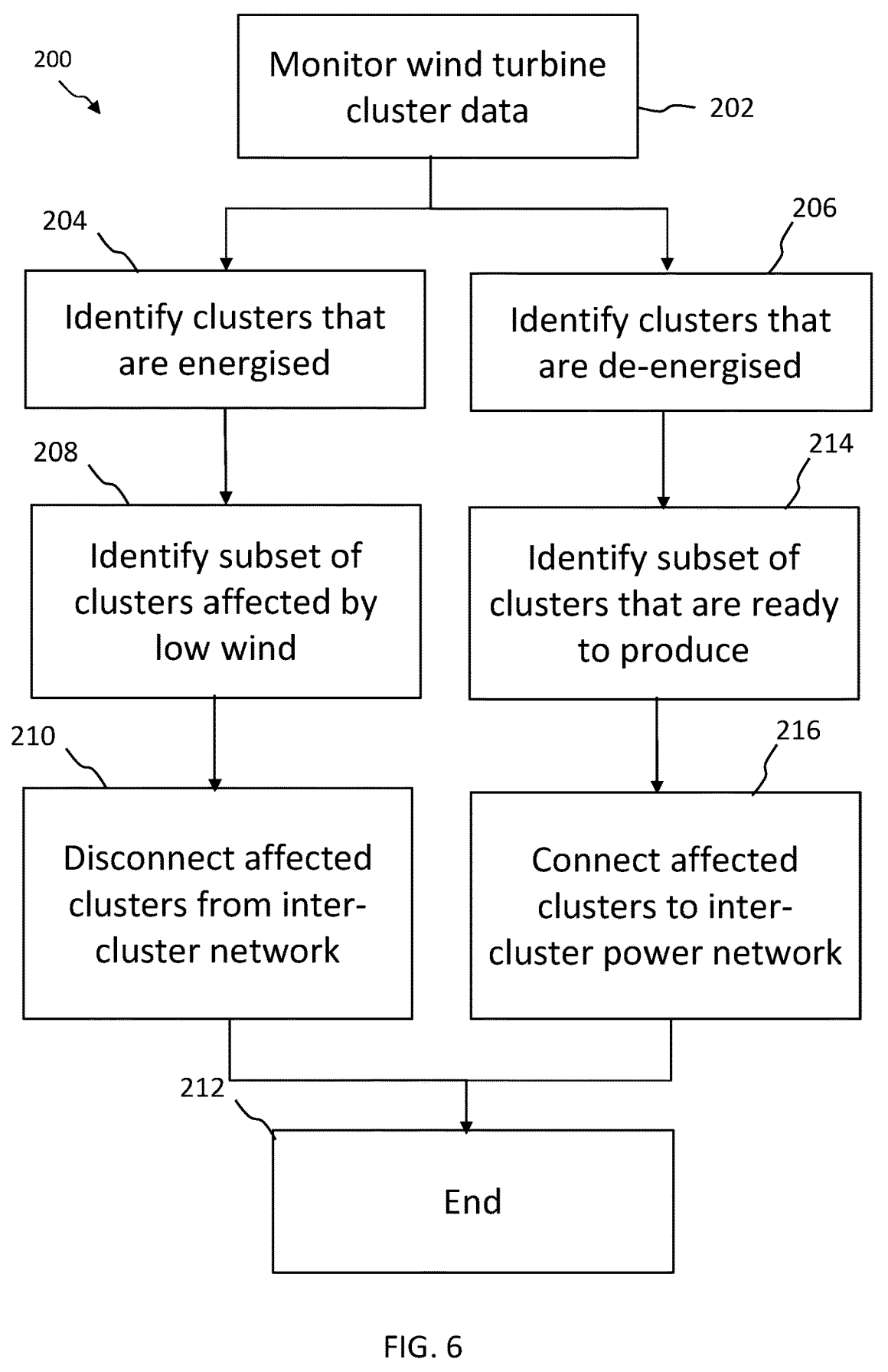

200

Monitor wind turbine cluster data — 202

204 Identify clusters that are energised

206 Identify clusters that are de-energised

208 Identify subset of clusters affected by low wind

214 Identify subset of clusters that are ready to produce

210 Disconnect affected clusters from inter-cluster network

216 Connect affected clusters to inter-cluster power network

212 End

FIG. 6

WIND POWER PLANT

TECHNICAL FIELD

This invention relates to a wind power plant and, in particular, arrangements for connecting wind turbines forming the wind power plant and to approaches for controlling the wind turbines forming the wind power plant.

BACKGROUND OF THE INVENTION

Conventionally, wind power plants comprise multiple wind turbines connected to each other by cable array arranged in a string configuration. In such a configuration, the cables in the cable array connecting the turbines are most frequently sized to enable the cables to accommodate the combined power of all turbines connected in the cable array.

Sometimes it has been chosen to decrease a cross-sectional area of one or more of the cable connections between end-most turbines since those cable will be carrying less power and so cost saving can be made. It is also known within a wind plant to connect groups or clusters of wind turbines together using a common connection point. The common connection points of the groups of wind turbines can then be connected to a power plant substation and/or distribution network cable for onward transmission to a power grid. Such a configuration can realise some advantages in that the connection cables used can be downsized since they are only required to handle power from a single wind turbine. This represents a significant reduction in the overall capital cost of installing a wind power plant. Moreover, since the wind turbines in a group are connected to a common connection point individually, and not in a string of serially-connected wind turbines, those wind turbines can be shut down or restarted separately and do not depend on the operational status of the other wind turbines in the group, which is the case of wind turbines connected in a string. However, while configuring wind turbines in a wind power plant in this manner has its advantages, there are further improvements that can be made.

It is against this background that the invention has been devised.

SUMMARY

Accordingly, in an aspect of the invention there is provided a wind power plant comprising a plurality of wind turbine clusters, wherein each wind turbine cluster includes a plurality of wind turbine generators connected to a connection station by an intra-cluster power network, each wind turbine generator being connected to the connection station by a respective one of a plurality of first switchgear devices of the connection station. Each of the plurality of wind turbine clusters are connected, by their respective connection stations, to an inter-cluster power network, by a respective one of a plurality of cluster transformers and a respective one of a plurality of second switchgear devices. The power plant also includes a control system operatively connected to the second switchgear devices of the plurality of wind turbine clusters, and wherein the control system is configured to identify the existence of a no-generation condition affecting at least one of the plurality of wind turbine clusters; control the switch status of the second switchgear devices, based on the identification, to control the connection status of each of the plurality of wind turbine clusters to the inter-cluster power network so as to reduce no load losses of the wind turbine clusters.

Advantageously, by identifying those clusters or group of interconnected wind turbines that are connected to a common energised transformer but which are not in a suitable condition to generate power, for example due to insufficient wind speeds, the opportunity is realised to de-energise that wind turbine cluster, and hence also the common transformer by disconnecting the associated switchgear device, which therefore reduces no-load losses of that wind turbine cluster.

Preferred and/or optional features are set out in the claims.

BRIEF DESCRIPTION OF THE DRAWINGS

The above and other aspects of the invention will now be described, by way of example only, with reference to the accompanying drawings, in which:

FIG. 6 is a flow chart illustrating a control regime for the wind power plant in FIG. 5 in accordance with an example of the invention.

DETAILED DESCRIPTION

Specific embodiments of the invention will now be described in which numerous features will be discussed in detail in order to provide a thorough understanding of the inventive concept as defined by the appended claims. However, it will be apparent to the skilled reader that the invention may be put in to effect without the specific details and that, in some instances, well known methods, techniques and structures have not been described in detail in order not to obscure the inventive concept unnecessarily.

The invention relates generally to approaches for connecting a plurality of wind turbines together to form a wind power plant installation and grouping those wind turbines together into 'clusters'. Wind turbines grouped into a cluster are connected to a centralised connection station by a suitable power network with suitable transformer hardware to enable voltage step-up and suitable switching hardware to enable each one of the wind turbines to be disconnected and reconnected to a power network under the control of a control system. A plurality of wind turbine clusters are connectable together in a series or parallel configuration or a combination of series and parallel connections. Beneficially, the control system is configured to control the connection of each wind turbine cluster to a power network or 'intra-cluster' power network via a respective cluster transformer and switchgear hardware to enable the respective clusters to be energised or deenergised under the control of the control system. This enables no load losses to be minimised during period of low wind for example where power generation is not available. Clusters can be deenergised as required by the control system which reduces no load losses in the affected transformers: both the transformers that connect a cluster to the intra-cluster network and also transformers that connect respective wind turbines to an inter-cluster network.

The wind turbine architecture used in the wind turbine clusters described here may be considered conventional. Before describing relevant control approaches, however, a discussion now follows of wind turbine architecture suitable for use in the examples of the invention.

Figure 1:
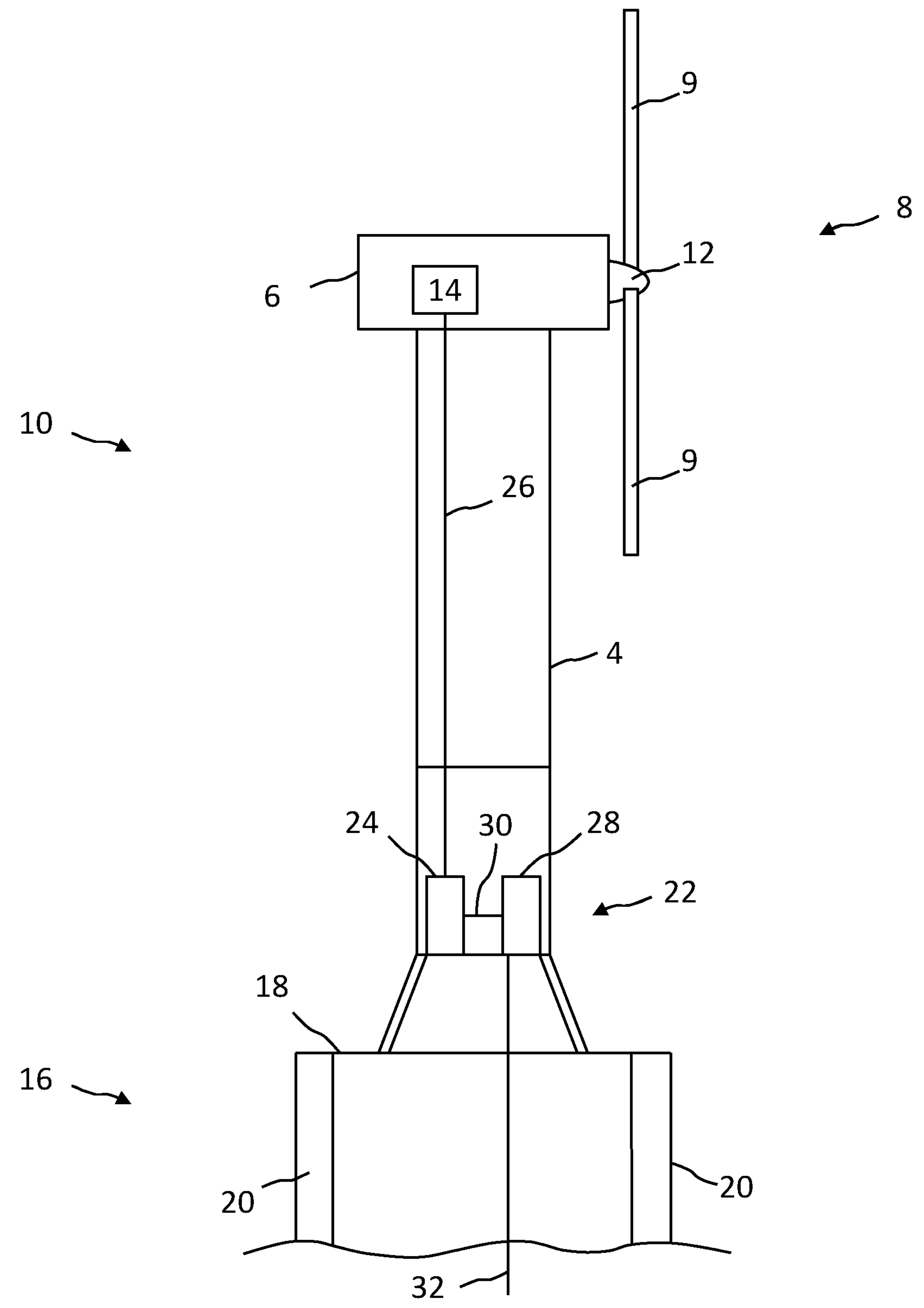
FIG. 1 is a schematic view of an exemplary wind turbine that may be used in a power plant according to the invention.

With reference to FIG. 1, a conventional three-bladed upwind horizontal-axis wind turbine (HAWT) 10 comprises a tower 4 supporting a nacelle 6, to which a rotor 8 is mounted. The wind turbine shown here is provided as exemplary of the type of wind turbine that may be used in the examples of the invention. However, the skilled person would understand that a specific type of wind turbine is not essential.

The rotor 8 comprises a plurality of rotor blades 9 extending radially from a central hub 12. In this example, the rotor 8 comprises three rotor blades 9, although only two are visible because of the orientation of the wind turbine 10. However, it will be apparent to the skilled reader that other rotor configurations are possible. The rotor 8 is operatively coupled to a power generation system 14 housed inside the nacelle 6. In addition to the power generation system 14, the nacelle 6 and the tower 4 house miscellaneous components required for converting wind energy into electrical energy, along with various other components needed to operate, control and optimise the performance of the wind turbine 10.

Wind turbines of the type shown in FIG. 1 may be used in onshore or offshore power plant installations without significant change to their configuration. In this particular example, the wind turbine 10 is an offshore wind turbine, as is demonstrated in FIG. 1 by the wind turbine 10 being mounted on an offshore foundation in the form of a monopile 16. In this example, the monopile 16 includes a platform 18 that is supported on a plurality of pillars 20 that are piled into the seabed. A transition piece 22 is provided on the platform 18, positioned below and arranged to carry the wind turbine 10.

A coupling transformer 24 is provided within the transition piece 22 and is connected to the power generation system 14 via a suitable down conductor link 26 that extends inside the tower 4. The coupling transformer 24 acts to couple the power generation system 14 to a grid transmission or distribution line (not shown). A switchgear device 28 is also located in the transition piece 22, and is connected to the coupling transformer 24 via a suitable conductor 30 which may be a set of power cables or a busbar. The switchgear device 28 functions to isolate the electrical equipment inside the wind turbine 10 in the event of a fault condition.

The switchgear device 28 provides suitable functionality and structure which allows the power generation system 14 to be selectably connected to the distribution grid. It also comprises a high-voltage coupling associated with an array cable 32. The down conductor 26, power generation system 14, conductor 30, coupling transformer 24 and switchgear device 28 all form part of the power equipment of the wind turbine 10, together with any other miscellaneous components required for converting wind energy into electrical energy. The position within the wind turbine 10 of these pieces of equipment may be varied from what is shown and described with reference to FIG. 1.

Figure 2:
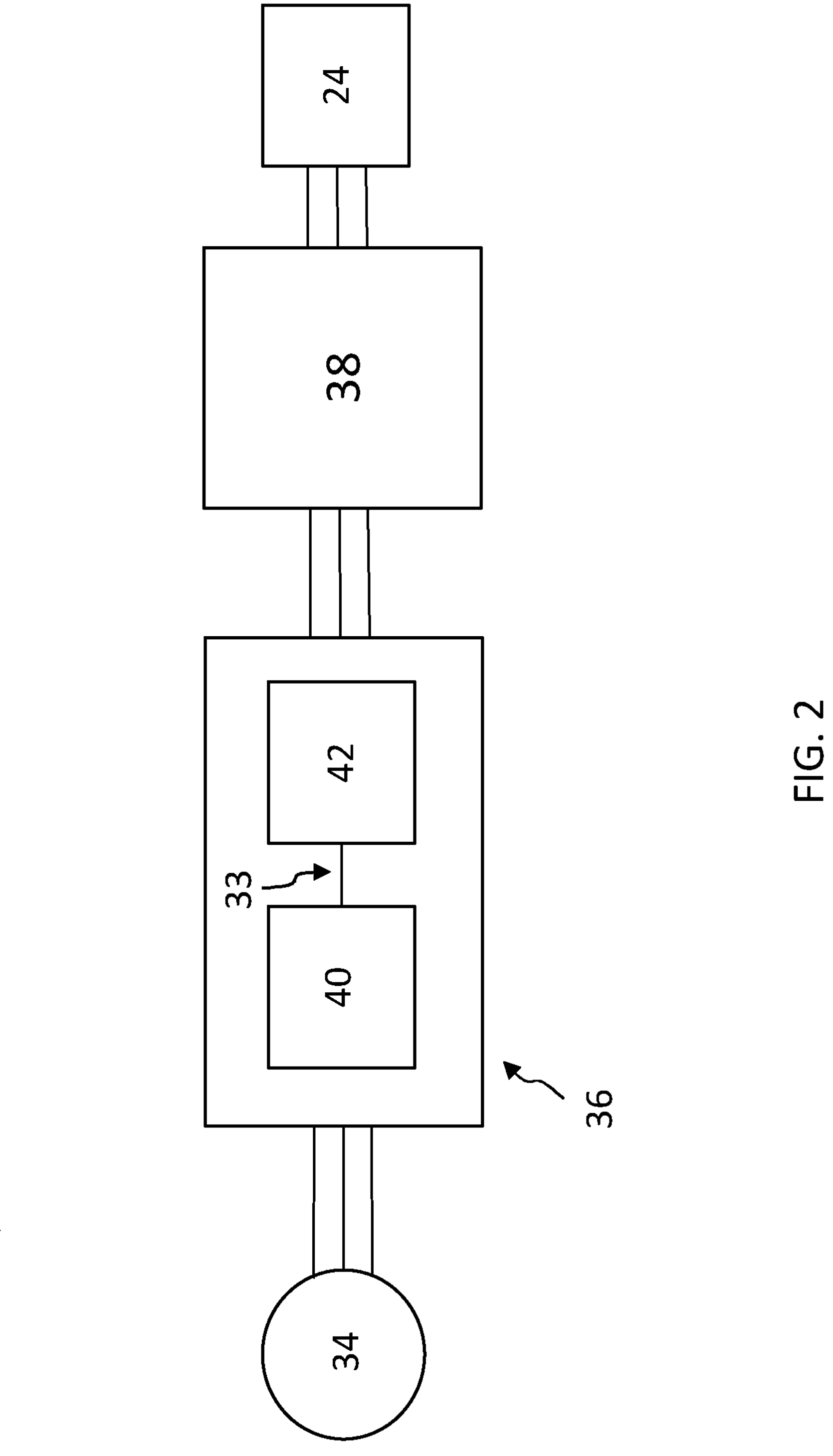
FIG. 2 is a schematic view of a power generation system of the wind turbine in FIG. 1.

The components of the power generation system 14 of the wind turbine 10 are conventional and will be familiar to the skilled person. Therefore, only a brief reference to those components will be made here for completeness and, moreover, the skilled reader will appreciate wind turbine power generation systems are available in different configurations but which perform the same basic function such that the invention is not limited to a particular architecture of generator or converter. In overview, and with reference to FIG. 2, the power generation system 14 comprises a generator 34 that is driven by the rotor 8 either directly or through a gearbox (not shown). The generator 34 is electrically coupled to a power converter system 36, which converts the electrical power output from the generator 34 into a form suitable for delivery to an electrical grid (not shown) via the coupling transformer 24. Suitable power conditioning electronics may be provided to condition the output power to reduce harmonics, for example. The conditioning electronics are shown as module 38 and may include filters, chokes and so on.

The power converter system 36 provides AC to AC conversion by feeding electrical current through a generator side converter 40 which is coupled to a line or machine side converter 42 by a DC-link 44. The converters 40/42 convert AC to DC and DC to AC respectively. This type of architecture is knows as a back-to-back full scale converter, and other topologies are known.

Figure 3:
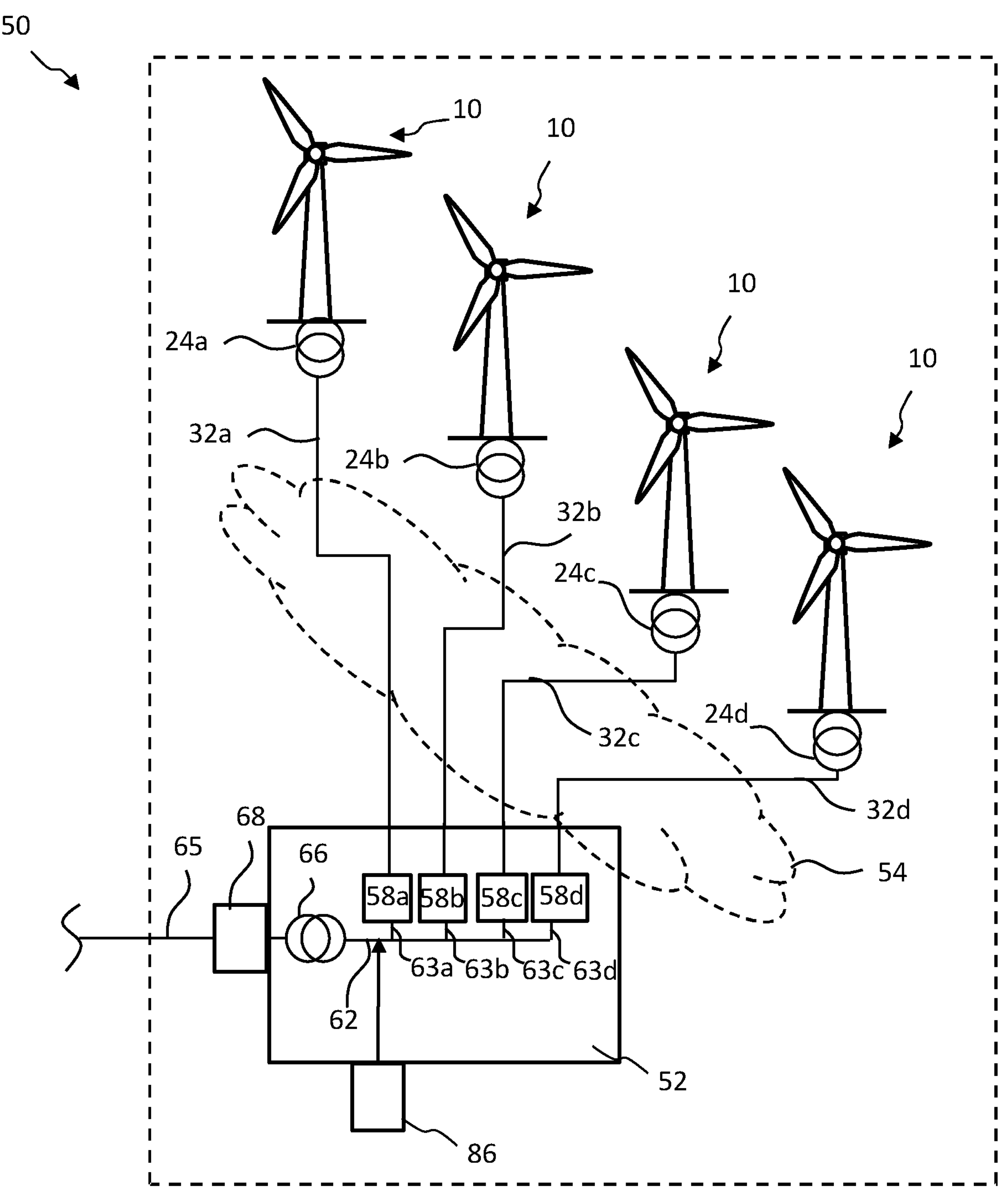
FIG. 3 is a schematic view of a wind turbine cluster comprising a plurality of wind turbines as exemplified in FIG. 1.

Although the wind turbine 10 has been described individually up to this point, it should be appreciated that the wind turbine 10 may be grouped with other wind turbines to increase generation capacity. FIG. 3 shows such a group of 'cluster' 50 of the wind turbines 10 discussed above, whereas FIG. 5 shows a power plant comprising a plurality of such wind turbine clusters 50 according to an example of the invention.

Referring firstly to FIG. 3, the wind turbine cluster 50 comprises four wind turbines 10 for clarity, but could in principle comprise any number. Typically it is envisaged that a wind turbine cluster 50 may include between five and twenty wind turbines, by way of non-limiting example.

Each of the wind turbines is connected to a connection station 52 through a intra-cluster power network 54. The intra-cluster power network 54 may be embodied in various ways but is here shown as including direct array cable connections 32*a*-*d* between each wind turbine and the connection station 52. In effect, therefore, each wind turbine 10 is connected to the connection station in a parallel or 'star' configuration. In other examples of the invention, however, some wind turbines may be connected in a series or 'ring' configuration.

Furthermore, in order that the wind turbines may generate power at the voltage required by the intra-cluster power network 52, each of the wind turbine includes a respective coupling transformer 24*a*-*d*, as discussed above.

To enable selective disconnection of each of the wind turbines 10 in the wind turbine cluster 50, each of the wind turbines includes a respective switchgear device 58*a*-*d*. Notably, the switchgear devices 58*a*-*d* can be provided in addition to or as an alternative to the switchgear devices 28 located in the wind turbines 10, as discussed above with reference to FIG. 1.

The respective switchgear devices 58*a*-*d* are shown here as located at the connection station 52. In this embodiment of the invention, the intra-cluster power network 54 comprises four array cables 32*a*-*d*, each one of which connecting one of the switchgear devices 58*a*-*d* to one of the coupling transformers 24*a*-*d* of the wind turbines 10.

The connection station 52 is represented as being a separate unit to the wind turbines in FIG. 3. However, it should be appreciated that the hardware of the connection station may be housed in one of the wind turbines 10 in the wind turbine cluster 50. This may be achieved within the wind turbine itself or within its supporting structures, such as the transition piece or lower sections of the turbine tower. The connection station 52 may also be embodied as a platform separate to the wind turbines, for example as a substation mounted on a monopile or jacket foundation, or a floating platform. In an onshore context, the connection station may also be placed outside, e.g. next to or nearby a particular WTG or remote therefrom.

Expressed another way, some or all parts of the connection station 52 may be provided at one of the wind turbines 19 of the wind turbine cluster 50, either within the structure of the wind turbine itself, e.g. within the tower, nacelle or transition piece of the wind turbine, or coupled to the exterior of the wind turbine in some way, e.g. contained on or in a platform against the side of the wind turbine or on a mounting such as the transition piece or foundation. In particular, the components of the transition piece that may be located at one of the wind turbines may be the cluster transformer 66 and the cluster switchgear device 68.

Each of the switchgear devices 58*a-d* is connected to a conductor or busbar 62 by outgoing power cables 63*a-d*. The bus bar 62 routes to a distribution cable 65 of the cluster 50 via a cluster transformer 66 and a cluster switchgear device 68. Notably, the cluster transformer 66 is located on the turbine side of the switchgear device 68 such that the switchgear device 68 is located between the cluster transformer 66 and the outgoing cable 65. This is as opposed to being located on the 'grid' side of the switchgear device in which the switchgear device would be located between the transformer and the wind turbines.

The cluster switchgear device 68 provides a connection between the switchgear devices 58*a*-58*d* and distribution cable 65 and enables all of the wind turbines 10 that are coupled to the connection station 52 to be simultaneously connected or disconnected from the wider wind power plant, as will be described.

Figure 4:
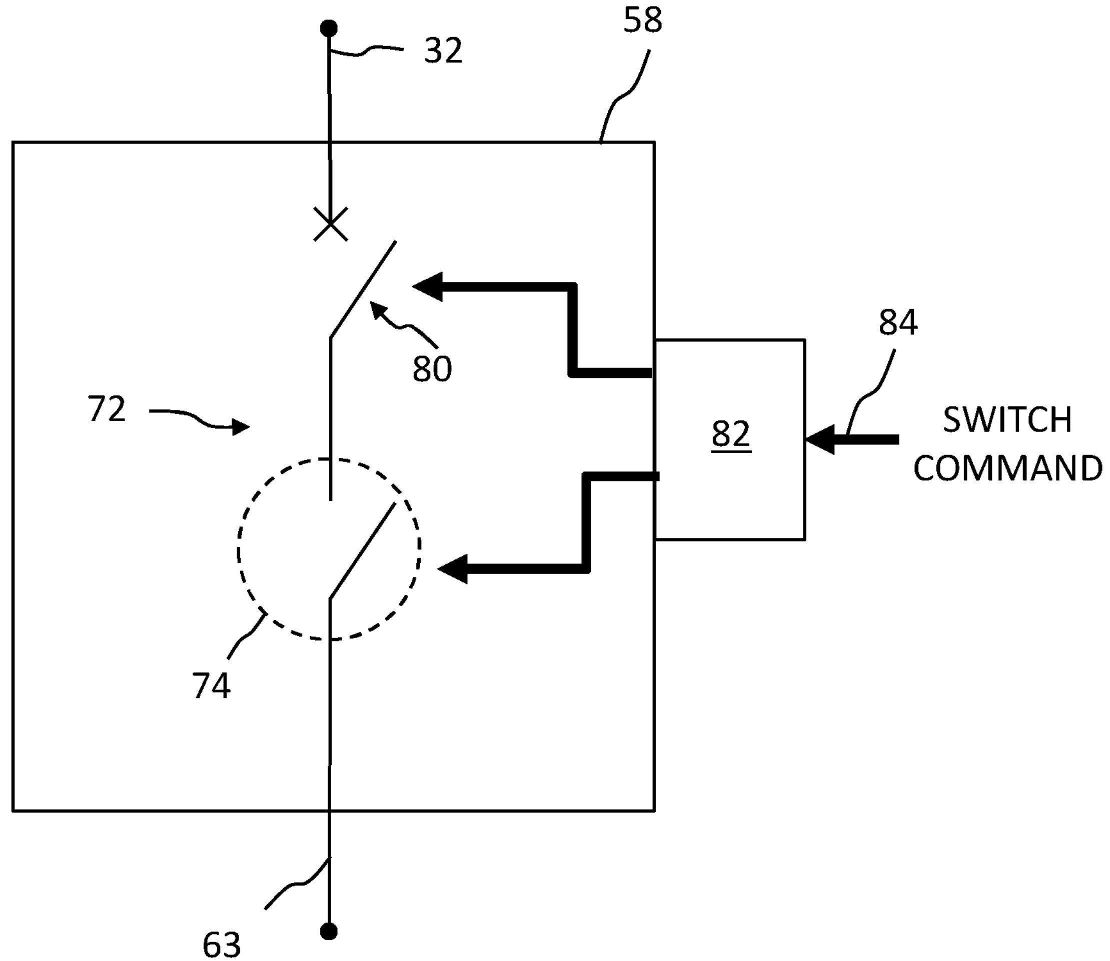
FIG. 4 is a schematic view of a switchgear as used in the wind turbine cluster in FIG. 3.

Before discussing FIG. 5, reference will first be made to FIG. 4 which provides a schematic view of one of the switchgear devices in respect of the individual wind turbines. It should be noted that the switchgear devices of the wind turbine clusters may have the same configuration.

In this instance, only one switchgear device is shown but it should be understood that the other switchgear devices may have the same configuration. Note that this configuration is exemplary and is not intended as essential to the invention. Other switchgear configuration may be used, as would be understood by the skilled person.

The switchgear device 58 includes a high-voltage joint, generally designated by 72, comprising a switch assembly 74 associated with outgoing conductor 63, together with a circuit breaker panel 80 for protecting the one or more coupling transformers to which the switchgear device 58 is connected. This arrangement, in addition to facilitating the testing of the outgoing power cables 63 prior to installation also enables the system to which the device 58 is connected to be de-energised by disconnecting it from the wind power plant for example when service operations are undertaken. In situations in which the wind turbine (or cluster thereof) needs to be altogether removed or electrically disconnected from the wind power plant, in the event of a fault, for example, the fact that the plurality of power cables are arranged in a parallel configuration, connecting a single switchgear device 58 to a single wind turbine 10, means that the wind turbine 10 is electrically isolated from the other wind turbines such that it can be disconnected from the connection station 52 without shutting down other wind turbines. Accordingly, the wind power plant associated with the wind turbine does not bear a disproportionate loss in energy production compared to the number of wind turbines being disconnected therefrom.

The switch gear device 58 also includes a control unit 82. The switchgear control unit 82 is configured to control the switching status of the switching device 58 by appropriate selective activation of the switching assembly 74 and the circuit breaker panel 80 in response to the receipt of the switching command 84. The switchgear control unit 82 therefore is equipped with suitable hardware and software for carrying out this functionality in receipt of the switch command 84.

The wind turbine cluster 50 may also be provided with an auxiliary power system, shown here generally at 86. The auxiliary power system 86 may be any suitable form to provide auxiliary power to the intra-cluster power network 54 in the event that connection to the main grid is lost. The auxiliary power system 86 may comprise a diesel generator for example, or it may be a battery backup system with suitable power conversion equipment to provide a power feed to the wind turbines 10. Although the auxiliary power system 86 is shown here as connected to the distribution cable 65 of the connection station 52, it may be connected to the wind turbines in an alternative manner and may, for example, be provide with a dedicated power supply network connected to each wind turbine 10 in the cluster 50.

Figure 5:
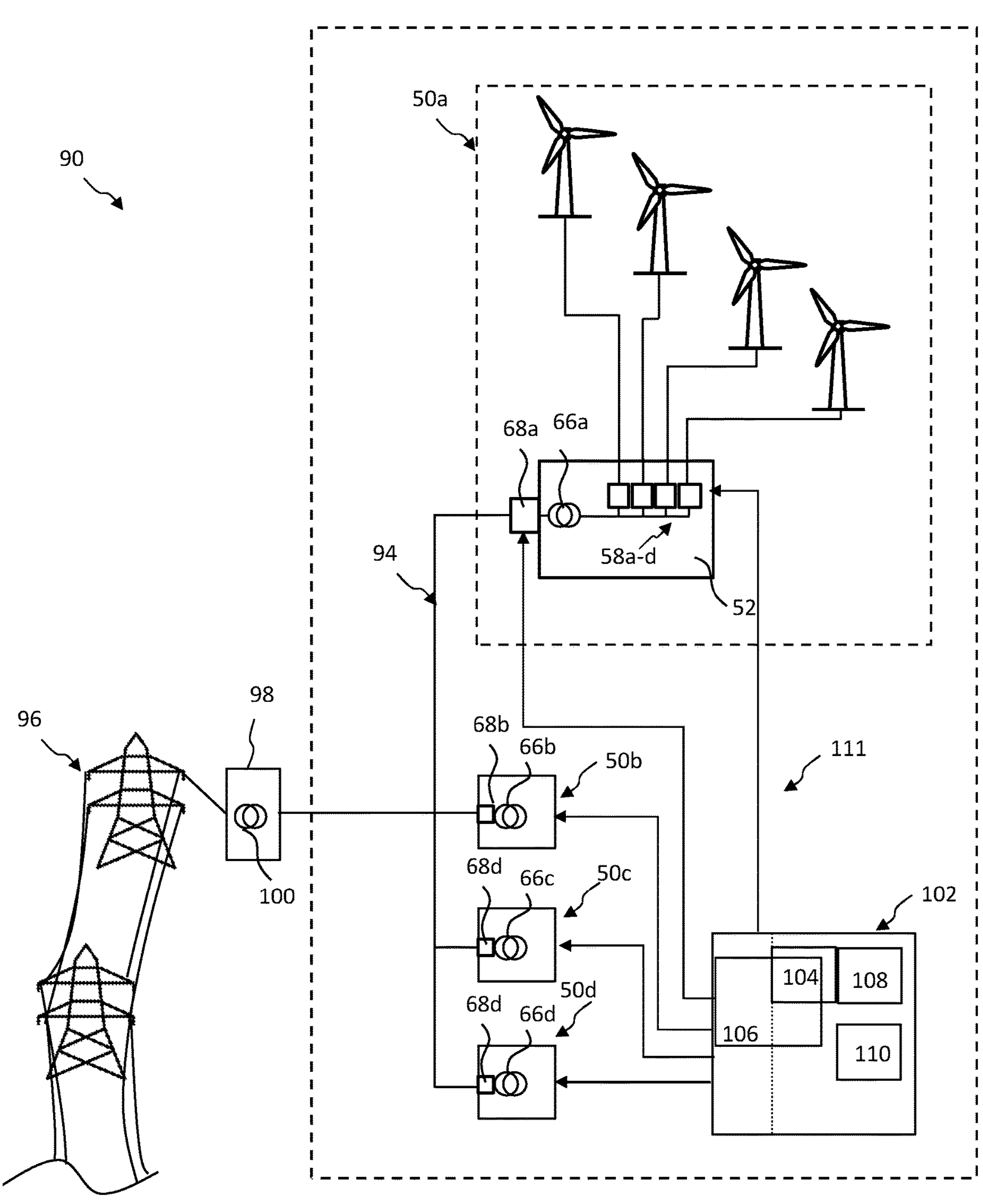
FIG. 5 is a schematic view of the wind power plant comprising plurality of wind turbine clusters exemplified in FIG. 3.

FIG. 5 shows a wind power plant 90 comprising a plurality of wind turbine clusters 50*a-d* as shown in FIG. 3 and as described above.

The wind power plant 90 includes four wind turbine clusters 50*a-d* in this example, although the configuration could include fewer than four clusters or many more. The wind power plant 90 may be an offshore wind power plant, as the scale provided for by the power plant configuration lends itself to the less restricted geographical coverage permitted by offshore plants. However, the technology could also be applied to onshore wind power plants, and also floating and/or nearshore powerplants.

Each of the wind turbine clusters 50*a-d* are connected to an inter-cluster power network 94 in the form of a collector cable 94. The distribution cables 65 of the wind turbine clusters connect to the intra-cluster power network 94. Note that the term "inter-cluster" refers to the power distribution connections between one wind turbine cluster and another, whereas the term "intra-cluster" power network refers to the power distribution connections between wind turbines within a single one of the wind turbine clusters.

In FIG. 5, the first 50*a* of the four wind turbine clusters 50*a-d* is shown in full, replicating FIG. 3. However, the other wind turbine clusters are shown as schematic blocks with no further detail. However, it should be noted that the wind turbine clusters 50*b-d* that are not shown in full detail should be considered to comprise the same or essentially the same hardware structure and functionality as the first wind turbine cluster 50*a*.

As can be appreciated in FIG. 5, the inter-cluster power network 94 is coupled to a main distribution grid 96 by a connection substation 98. The connection substation 98 may include a suitable transformer 100 to enable the voltage of the inter-cluster power network 94 to be stepped up to an appropriate voltage for long distance transmission.

Notably, transformers are provided for each of the wind turbine clusters 50*a-d* and also for each wind turbine within the wind turbine clusters. This enables the voltage levels on the intra-cluster power network 54 and the inter-cluster power network 94 to be different. For example, the transformers of the wind turbines 24*a-d* (as seen in FIG. 3) may be configured to support a voltage on the intra-cluster power network 54 of less than 70 kV, for example between 1 kV and 70 kV. For example, the voltage may be 1 kV, 3 kV, 10 kV, 20 kV, 33 kV or 66 kV, which is classed generally as medium voltage. In some examples, a DC power network is envisaged in which case a power converter would be necessary to convert AC voltage from the DC input voltage prior to be stepped up in voltage by the respective transformers of the connection stations 52.

However, the presence of the cluster transformers 68*a-d* enables a higher voltage to be supported on the inter-cluster power network 94. Such a voltage may be in the high voltage range, for example above 100 kV, and more particularly less than 400 kV, for example between 100 kV and 400 kV. For example, the cluster transformers 68*a-d* may be rated at 132 kV, 220 kV or 390 kV.

A relatively high voltage on the inter-cluster power network 94 can be beneficial in various ways. For example, a high voltage means that more wind turbines can be connected together within a cluster which accordingly can support a larger wind park. Higher voltages also more generally lead to reduced energy losses.

In an offshore context, a raised voltage level at around 400 kV has the effect of reducing the number of set-up voltage steps required to raise the voltage to an appropriate level to connect to onshore distribution grids, thereby reducing capital cost.

The wind power plant 90 also includes a power plant control system or 'PPC' 102. As will be described, the PPC 102 has suitable functionality to control the switching status of the switchgear devices 68-*d* that connect the wind turbine clusters 50*a-d* to the inter-cluster power network 94. The PPC 102 may also have suitable functionality to control the switching status of the switchgear devices 58*a-d* that connect the connection station 52 to the individual wind turbines 10 in each wind turbine cluster 50*a-d*.

In this discussion, the PPC 102 is shown as being embodied by a single functional module. However, this representation is for convenience of illustration and so it should be appreciated that the functionality represented by the control system 102 may be implemented as a centralised or a distributed architecture, as appropriate. Furthermore, that functionality may be implemented in hardware, software, or firmware as appropriate, the configuration of which would be within the skills of a skilled person. As such, the functionality may be implemented in discrete and separated processing environments, or that functionality may be incorporated into a single processing environment. The processing environment may be run on a dedicated computing system having dedicated memory, I/O system and processor, or, for example, it may be run as a functional partition on a computing system that is used for other functionality. For example the functionality described here could be implemented on a power plant controller that also has oversight responsibility for operation of the wind power plant, including active and reactive setpoint dispatch, fault ride through strategy, wind tracking and so on. Such a power plant controller is a standard central control authority within a wind power plant and could be readily adapted to facilitate the processing requirements of the functionality described here.

As an alternative, it is envisaged that one of the wind turbines in one of the wind turbine clusters 50*a-d* could provide a suitable computing environment for carrying out the method according to the invention by virtue of an on-board wind turbine controller, which could be configured appropriately to communicate to the other wind turbines in its cluster for the transmission of the control setpoints The PPC 102 is a suitable computer system for carrying out the controls and commands as described above and so incorporates a processing module 104, a connectivity module 106, a memory module 108 and a sensing module 110. The sensing module 110 may be configured appropriately to sense various data, for example the current weather conditions. The connectivity module 106 may be appropriately configured to receive operational data from the wind turbine clusters 50*a-d* and the individual wind turbines therein. For example, the wind turbine clusters may provide operational data to the PPC 102.

In response to receiving operational data from the wind turbine clusters, the PPC 102 is configured to send appropriate control commands thereto. In particular, the PPC 102 is configured to send switch control commands to the switchgear devices 68*a-d* of the wind turbine clusters.

It will be noted that FIG. 5 is a schematic view, so the way in which the control commands are transferred to the wind turbine clusters 50*a-d* is not depicted explicitly. However, it will be appreciated that suitable connections 111 may be provided to interconnect the PPC 102 and the wind turbine clusters 50*a-d* and/or wind turbines 10. The interconnections 111 may be direct or 'point to point' connections, or may be part of a local area network (LAN) operated under a suitable protocol (CAN-bus or 20 Ethernet for example). Also, it should be appreciated that rather than using cabling, the control commands may be transmitted wirelessly over a suitable wireless network, for example operating under WiFi™ or ZigBee™ standards (IEEE802.11 and 802.15.4 respectively).

One control challenge with large-scale wind power plants such as that shown in FIG. 5 is the electrical losses involved with the operation of the transformers. Electrical losses generally can be classified into load losses and no-load losses. As the skilled person would understand, load losses occur when active power is being transmitted across the primary and secondary coils of a transformer and is due to the electrical resistance of the copper coils due to current flowing through them. However, even when the transformer is not transmitting active power, or transmitting a small amount of active power, the transformer is still subject to electrical losses in the form of no-load losses. These include iron losses which may be understood as eddy current losses and hysteresis losses, stray losses and dielectric losses. No-load losses may occur in a wind power plant when the wind power plant is operating under very low or no wind conditions such that no power is being generated by the wind power plant, although the wind power plant remains connected to the distribution grid so that power generation can start again when sufficient wind is available. Such no-load losses can be significant when it is considered that, typically, a wind power plant may experience between 400 and 900 'no wind' hours on a yearly basis.

To address this challenge, the PPC 102 discussed above is configured to carry out the following method, as referenced in FIG. 6.

In a broad sense, method 200 in FIG. 6 is directed to mitigating the no-load losses in the wind power plant 90, as discussed above, by monitoring the operation of the wind turbine clusters to determine whether any of the wind turbine clusters are operating in a no generation condition. Such a no generation condition may be present where the wind turbines in a wind turbine cluster are experiencing wind conditions that are insufficient for the wind turbines to generate power. For example, the wind speed within the wind turbine cluster may be below the cut-in wind speed at which point wind turbines would usually begin to generate power.

Although the specific example refers to a no-generation condition arising from a lack of sufficient wind speed, other scenarios are contemplated. For example one or more f the WTGs may be in a failure mode or maintenance mode, in which case local disconnection would be helpful to reduce no load losses in the transformer equipment.

The PPC 102 is configured to monitor 202 wind turbine cluster data by receiving operational data from the wind turbine clusters 50*a-d*. The operational data may include a range of parameters depending on what functionality is required of the PPC 102, but in this specific embodiment the PPC 102 received wind condition data from each of the wind turbine clusters 50*a-d*. The PPC 102 also receives data indicating the operational status of the wind turbines in the wind turbine clusters. This provides the PPC 102 with suitable data from which it can be determined i) whether the wind turbines within the wind turbine clusters are operating and producing power, ii) whether the wind turbines within the wind turbine clusters are operating and not producing power, and iii) whether the wind turbines within the wind turbine clusters are shutdown, or are in a fault state.

The type of wind condition data that the PPC 102 may be configured to use depends on the analysis that is required. For example, a simple approach would be for the PPC 102 to receive wind speed data from a single one of the wind turbines in each of the wind turbine clusters 50*a-d*. That wind turbine may be positioned in a strategic place in the wind turbine cluster to allow inference about the wind conditions affecting the other wind turbines. For example, the monitored wind turbine could be positioned approximately in the geometric centre of the wind turbine cluster. The PPC 102 may then infer from the received wind speed data of a single wind turbine what the wind speed is for the other wind turbines.

In a more sophisticated approach, the PPC 102 may be configured to receive wind speed data from some or all of the wind turbines in a particular wind turbine cluster. The PPC 102 is therefore able to make an analysis on a more complete data set representing the entire wind turbine cluster.

Still further, in addition to receiving wind speed data, the PPC 102 may receive other data relating to wind conditions on which decisions can be based. For example, the PPC 102 may be configured to process wind forecast data which provides a prediction of the wind speed over a predetermined forecast period based on an appropriate wind forecasting model.

Based on the operational data the PPC 102 is configured to evaluate the operational performance of the wind turbine clusters to determine which are operational (step 204) or 'energised' and which of the wind turbine clusters are non-operational or 'de-energised' (step 206).

The determination of whether a wind turbine cluster 50*a-d* is energised or de-energised may be determined based on an evaluation of the switching status of the switchgear device 68*a-d* associated with the wind turbine clusters 50*a-d*. This status may be determined by appropriate analysis of the wind turbine cluster data.

Therefore, if the status of a switchgear device 68*a-d* is energised such that the associated wind turbine cluster 50*a-d* is connected to the inter-cluster power network 94, then the PPC 102 determines that the relevant wind turbine cluster is energised, whether or not that wind turbine cluster is actually generating power.

Conversely, if the status of a switchgear device 68*a-d* is de-energised such that the associated wind turbine cluster 50*a-d* is not connected to the inter-cluster power network 94, then the PPC 102 determines that the relevant wind turbine cluster is de-energised.

These two different scenarios will be considered in turn, with reference first to the scenario where the PPC 102 identifies wind turbine clusters 50 that are in an energised state.

The method then moves on to step 208, at which step the method evaluates the wind condition data of the wind turbine clusters that are determined to be in the energised state. At this step, the method is configured to determine which of the wind turbine clusters that are energised are actually in a condition where they are not actually producing power.

The most common condition that would cause this scenario is if a particular wind turbine cluster is affected by a low wind condition. That is, insufficient wind speed for some or all of the wind turbines within a particular wind turbine cluster to generate power, i.e. wind speed below cut-in wind speed.

Another scenario could be if the wind turbine cluster was affected by excessively high wind conditions such that the wind speed across the wind turbine cluster is in excess of the cut-off wind speed relevant to the wind turbines in the wind turbine clusters. A further scenario is contemplated where wind conditions are such that there is sufficient wind for the WTGs to produce power, but at a relatively low level. In such a scenario suitable logic could be devised to identify a no-generation condition where wind speed is sufficient but power generation is at a low level such that it is determined to be more effective to disconnect the WTGs in order to reduce no-load losses.

In the event that the method identifies that one or more of the wind turbine clusters are energised but are subject to a no-generation condition, the method moves to step 210. At this point, the method takes action to disconnect the affected wind turbine clusters from the inter-cluster power network 94. This can be achieved by the PPC 102 deenergizing any of the cluster switchgear devices 68*a-d* that are associated with a wind turbine cluster 50*a-d* that is in a no-generation condition.

If there are multiple ones of the wind turbine clusters 50*a-d* which are in a non-generation condition, the method may comprise de-energising the associated switchgear devices 68*a-d* in a sequential manner. In other words, the PPC 102 will control the affected switchgear devices 68*a-d* so that they are de-energised individually so that one of the plurality of affected switchgear devices 68*a-d* is de-energised before controlling the next one of the affected switchgear devices 68*a-d* to be de-energised.

One all affected switchgear devices 68*a-d* of the associated wind turbine clusters 50*a-d* in a no-generation condition have been de-energised, the method terminates at step 212 and then returns to step 202 to repeat the method.

Returning to step 206, at this point the method has determined that there are one or more wind turbine clusters 50*a-d* that are disconnected from the inter-cluster power network 94, i.e are in the de-energised state.

From here, the method then moves to step 214 at which point the method evaluates the wind condition data of the wind turbine clusters that are determined to be in the de-energised state and to determine which of the de-energised wind turbine clusters are subject to wind conditions that would enable them to produce power.

For example, this scenario may be present where one or more of the wind turbine clusters 50*a-d* were disconnected by their associated switchgear device 68*a-d* due to a low wind condition but subsequently the wind speed at the cluster has increase to a level that it is between the cut-in wind speed and the cut-off wind speed.

Once the method 200 has determined which of the wind turbine clusters 50*a-d* are de-energised but are ready to produce power, the method moves onto step 216 where it controls the switchgear devices 68*a-d* associated with the relevant de-energised wind turbine clusters to reconnect those wind turbine clusters to the inter-cluster power network 94.

In the event that more than one wind turbine cluster 50*a-d* has been identified as needing to be reconnected to the inter-cluster power network 94, the method may reconnect the switchgear devices 68*a-d* in a sequential manner, in a comparable manner to what has been discussed with respect to step 210. Reconnecting the switchgear devices 68*a-d* sequentially means that inrush currents into the associated coupling transformers 66 are limited to one transformer at a time, thereby avoiding a possibly destabilizing effect on the power network 94. This can be particularly beneficial where there is a long distance between the wind turbine clusters and the onshore connection substation 98. In such an example, initially energising the closest wind turbine cluster to the connection substation 98 before connecting the other wind turbine clusters can mitigate inrush current significantly.

One all affected switchgear devices 68*a-d* of the associated wind turbine clusters 50*a-d* in a ready to generate condition have been energised, the method terminates at step 212 and then returns to step 202 to repeat the method.

In the above method, it should be noted that the method may include controlling the switch status of the switchgear devices 58*a-d* of the wind turbines within the wind turbine clusters to the intra-cluster network 54. The controlled switching of the turbine specific switchgear devices 58*a-d* can be carried out also in sequence. When controlling the switch status of a cluster switchgear device 68*a-d* to disconnect or reconnect it associated wind turbine cluster to the inter-cluster power network 94, the PPC 102 may control the connection status of the turbine specific switchgear devices 58*a-d* to also disconnect or reconnect as appropriate. The operation of the turbine specific switchgear devices 58*a-d* may be carried out before operation of the cluster switchgear devices 68*a-d*.

Note that in the above discussion, the method may be carried out by the PPC 102. However, it is also possible for some of the steps to be carried out by other computing entities. For example, instead of the PPC 102 receiving operational data from the wind turbine clusters 50*a-d*, as discussed above, after which the PPC 102 carries out appropriate data analysis, it is envisaged that the analysis of the operational data may be carried out within the wind turbine clusters themselves by a suitable computing entities.

Such a computing entity may be a wind turbine controller of one of the wind turbines within a wind turbine cluster. Such a wind turbine controller could be designated as the 'lead' controller within that group of wind turbines, and be responsible for cluster-specific data gathering, analysis and reporting of cluster conditions to the PPC 102. As such, the such a controller could simply provide the PPC 102 with a status indication as to whether the cluster is connected or disconnected from the inter-cluster power network 94, and whether the wind conditions are sufficient or not sufficient for power generation.

The skilled reader will appreciate that modifications may be made to the specific embodiments of the wind power plants described above without departing from the inventive concept as defined in the appended claims, and that other embodiments of the wind power plant in accordance with the inventive concept are also envisaged. The invention has been described with reference to particular examples in order to illustrate the principles of operation. The above description is thus by way of illustration and directional references and any other terms having an implied orientation refer only to the orientation of the features as shown in the accompanying drawings. They should not be read to be requirements or limitations, particularly as to the position, orientation, or use of the invention unless specifically set forth in the appended claims. Connection references (e.g., attached, coupled, connected, joined, secured and the like) are to be construed broadly and may include intermediate members between a connection of elements and relative movement between elements. As such, connection references do not necessarily infer that two elements are directly connected and in fixed relation to each other, unless specifically set forth in the appended claims.

The invention claimed is:

1. A wind power plant comprising:

a plurality of wind turbine clusters, wherein each wind turbine cluster includes a plurality of wind turbine generators connected to a connection station by an intra-cluster power network, each wind turbine generator being connected to the connection station by a respective one of a plurality of first switchgear devices of the connection station; and wherein each of the plurality of wind turbine clusters are connected, by their respective connection stations, to an inter-cluster power network, by a respective one of a plurality of cluster transformers and a respective one of a plurality of second switchgear devices, a control system operatively connected to the second switchgear devices of the plurality of wind turbine clusters, and wherein the control system is configured to at least:

identify the existence of a no-generation condition affecting at least one of the plurality of wind turbine clusters;

control the switch status of the second switchgear devices, based on the identification, to control the connection status of each of the plurality of wind turbine clusters to the inter-cluster power network so as to reduce no load losses of the wind turbine clusters.

2. The wind power plant of claim 1, wherein the intra-cluster power network has a rated voltage that is lower than the inter-cluster power network.

3. The wind power plant of claim 2, wherein the intra-cluster power network has a rated voltage less than 70 kV.

4. The wind power plant of claim 2, wherein the inter-cluster power network has a rated voltage that is greater than 100 kV.

5. The wind power plant of claim 1, wherein the respective connection station of at least one of the wind turbine clusters (50*a-d*) is located proximate to one of the wind turbines within that wind turbine cluster.

6. The wind power plant of claim 5, wherein at least some components of the connection station located proximate to a respective wind turbine are located within the structure of that wind turbine.

7. The wind power plant of claim 6, wherein the at least some components include the cluster transformer of the respective wind turbine cluster and the second switchgear device of the respective wind turbine cluster.

8. The wind power plant of claim 1, wherein each cluster transformer is located on the turbine-side of the respective second switchgear device.

9. The wind power plant of claim 1, wherein to identify the existence of a no-generation condition, the control system is configured to:

receive wind data from each of the plurality of wind turbine clusters, control the switch status of at least one of the second switchgear devices based on the wind data received from wind turbine cluster associated with said second switchgear device.

10. The wind power plant of claim 9, wherein the control system is configured to control the switch status of a second switchgear devices associated with a wind turbine cluster from an energized status to a deenergized status when the received wind data associated with the same wind turbine cluster indicates that wind conditions are insufficient for power production.

11. The wind power plant of claim 10, wherein the control system is configured to control the switch status of the first switchgear devices between an energized status and a deenergized status; and wherein the control system is configured to control the switch status of the first switchgear devices associated with a wind turbine cluster from an energized status to a deenergized status before controlling the switch status of the second switchgear devices associated with the same wind turbine cluster from an energized status to a deenergized status.

12. The wind power plant of claim 9, wherein the control system is configured to control the switch status of a second switchgear device associated with a wind turbine cluster from a deenergized status to an energized status when the received wind data associated with the same wind turbine cluster indicates that wind conditions are sufficient for power production of that wind turbine cluster.

13. The wind power plant of claim 12, wherein the control system is configured to control the switch status of the second switchgear devices from a deenergize zed status to an energized status in a predetermined sequence.

14. The wind power plant of claim 13, wherein the predetermined sequence is based on a measured connection distance between the respective cluster and a grid connected substation.

15. The wind power plant of claim 1, wherein the control system is operatively connected to the first switchgear devices of the respective plurality of wind turbine generators within respective wind turbine clusters, and wherein the control system is configured to control the switch status of the first switchgear devices to control the connection status of each of the plurality of wind turbine generators to the associated intra-cluster power network.

16. The wind power plant of claim 15, wherein the control system is configured to control the switch status of the first switchgear devices between an energized status and a deenergized status.

17. The wind power plant of claim 16, wherein the control system is configured to control the switch status of the first switchgear devices from a deenergized status to an energized status in a predetermined sequence.

18. A method of operating a wind power plant, the power plant comprising a plurality of wind turbine clusters, wherein each wind turbine cluster includes a plurality of wind turbine generators connected to a connection station by an intra-cluster power network, each wind turbine generator being connected to the connection station by a respective one of a plurality of first switchgear devices of the connection station; and wherein each of the plurality of wind turbine clusters are connected, by their respective connection stations, to an inter-cluster power network, by a respective one of a plurality of cluster transformers and a respective one of a plurality of second switchgear devices, wherein the method comprises:

identifying the existence of a no-generation condition affecting at least one of the plurality of wind turbine clusters; and controlling the switch status of the second switchgear devices, based on the identification, to control the connection status of each of the plurality of wind turbine clusters to the inter-cluster power network so as to reduce no load losses of the wind turbine clusters.

* * * * *